United States Patent [19]

Ishiyama et al.

[11] Patent Number: 4,728,086
[45] Date of Patent: Mar. 1, 1988

[54] VIBRATION ISOLATING APPARATUS

[75] Inventors: Tatsuro Ishiyama; Michihiro Orikawa, both of Yokohama, Japan

[73] Assignee: Bridgestone Corporation, Tokyo, Japan

[21] Appl. No.: 126

[22] Filed: Jan. 2, 1987

[30] Foreign Application Priority Data

Jan. 20, 1986 [JP] Japan .................................. 61-9705

[51] Int. Cl.⁴ .............................................. F16F 1/48
[52] U.S. Cl. ................................. 267/140.1; 267/35; 267/141.2; 248/562
[58] Field of Search .............. 267/140.1, 140.2, 140.3, 267/140.4, 140.5, 141, 141.1, 141.2, 141.3, 35; 248/562, 565, 636, 637, 638; 180/312

[56] References Cited

U.S. PATENT DOCUMENTS

| | | | |
|---|---|---|---|
| 4,588,174 | 5/1986 | Konishi | 267/140.1 |
| 4,605,207 | 8/1986 | Konishi | 267/140.1 |
| 4,630,806 | 12/1986 | Dan et al. | 267/140.1 |

FOREIGN PATENT DOCUMENTS

| | | | |
|---|---|---|---|
| 3617787 | 11/1986 | Fed. Rep. of Germany | 267/140.1 |
| 0184740 | 9/1985 | Japan | 267/140.1 |
| 60-179542 | 9/1985 | Japan . | |
| 0045131 | 3/1986 | Japan | 267/140.1 |

*Primary Examiner*—Duane A. Reger
*Assistant Examiner*—Matthew C. Graham
*Attorney, Agent, or Firm*—Parkhurst & Oliff

[57] ABSTRACT

A vibration isolating apparatus wherein an inner tube and an outer tube are disposed coaxially or axially parallel with each other, and a pair of liquid chambers are formed in a vibration absorbing resilient member disposed between the inner and outer tubes. The liquid chambers are communicated with each other through a limiting passage. Each of the liquid chambers is divided by a partition having a flow passage, and one wall of each liquid chamber is defined by a flexible membrane which is capable of expanding and contracting the liquid chamber. Accordingly, low-frequency vibrations of relatively large amplitude are damped by virtue of the limiting passage. When high-frequency vibrations of relatively small amplitude occur, the flexible membranes are deformed in response to the rise and fall in internal pressure in the liquid chambers, causing liquid-column resonance to occur at each flow passage, and thus allowing the dynamic scale factor to be lowered.

20 Claims, 11 Drawing Figures

F I G. 11
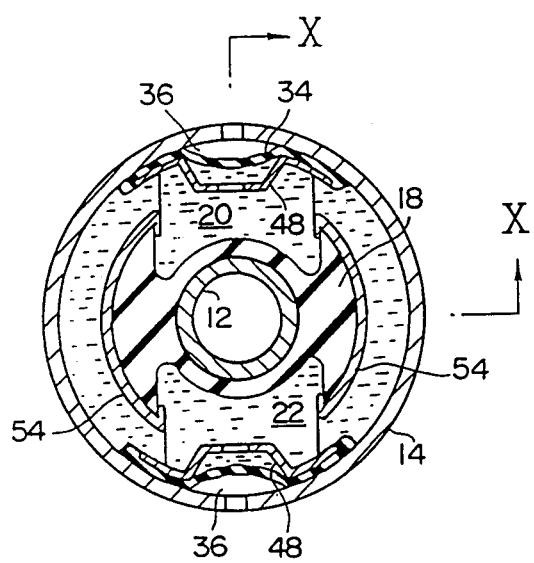

VIBRATION ISOLATING APPARATUS

BACKGROUND OF THE INVENTION

1. Field of the Invention

The present invention relates to a vibration isolating apparatus which has an inner tube and an outer tube and which may be employed as an engine mount of the like.

2. Description of the Related Art

Vibration isolating apparatuses include a so-called bush type rubber vibration isolator in which an inner tube and an outer tube are disposed coaxially or axially parallel with each other, and one type of such vibration isolating apparatus wherein a liquid chamber is provided in a resilient member disposed between the inner and outer tubes has already been proposed (see Japanese Patent Laid-Open No. 179542/1985).

In such conventional vibration isolating apparatus, the liquid chamber is partitioned into a plurality of small liquid chambers, and these chambers are communicated with each other through an orifice. If the dimensions of this orifice are set so as to damp low-frequency vibrations of relatively large amplitude, when a high-frequency vibration of relatively small amplitude occurs, the dynamic scale factor is increased and this causes the vibration transmitting characteristics to be undesirably deteriorated. Conversely, if the dimensions of the orifice are set so as to improve the vibration transmitting characteristics for high-frequency vibrations of relatively small amplitudes, it is impossible to damp low-frequency vibrations of relatively large amplitude, disadvantageously.

SUMMARY OF THE INVENTION

In view of the above-described circumstances, it is a primary object of the present invention to provide a vibration isolating apparatus capable of absorbing vibrations over a widened frequency range.

To this end, the present invention provides a vibration isolating apparatus comprising: an inner tube which is able to be connected to either one of a vibration generating portion and a vibration receiving portion; an outer tube disposed on the outer peripheral portion of the inner tube so that the inner and outer tubes are coaxial or axially parallel with each other, the outer tube being able to be connected to the other of the vibration generating portion and the vibration receiving portion; a vibration absorbing resilient member interposed between the inner and outer tubes; a pair of liquid chambers provided in the resilient member so as to oppose each other across the inner tube; a limiting passage for providing communication between the pair of liquid chambers; a flexible membrane for partitioning each of the liquid chambers and an air chamber from each other, the air chamber being provided adjacent to the liquid chamber; and a partition for partitioning each of the liquid chambers into a plurality of small liquid chambers, the partition having a flow passage for providing communication between the small liquid chambers By virtue of the above-described arrangement, when a low-frequency vibration of relatively large amplitude occurs, one of the small liquid chambers is compressed, and the other small liquid chamber is expanded, and a fluid is thereby forced to flow into the second small liquid chamber through the limiting passage, thus obtaining an enhanced vibration damping effect.

When a high-frequency vibration of relatively small amplitude occurs, the limiting passage is readily clogged or loaded. However, in such case, the flexible membrane is deformed in response to the rise and fall in internal pressure in each liquid chamber, so that it becomes possible to greatly lower the dynamic scale factor by means of liquid-column resonance which occurs when the liquid passes through the flow passage.

Thus, the apparatus according to the present invention enables absorption of vibrations over a widened frequency range.

The volumetric capacity of the air chamber is preferably made substantially equal to the amount of fluid which is moved by a high-frequency vibration of relatively small amplitude, and the cross-sectional area of the flow passage defined by the partition is preferably set so as to be larger than that of the limiting passage.

The above and other objects, features and advantages of the present invention will become more apparent from the following description of the preferred embodiments thereof, taken in conjunction with the accompanying drawings

BRIEF DESCRIPTION OF THE DRAWINGS

FIG. 11 is a sectional view taken along the line XI—XI in FIG. 10.

DESCRIPTION OF THE PREFERRED EMBODIMENTS

Figure 1:
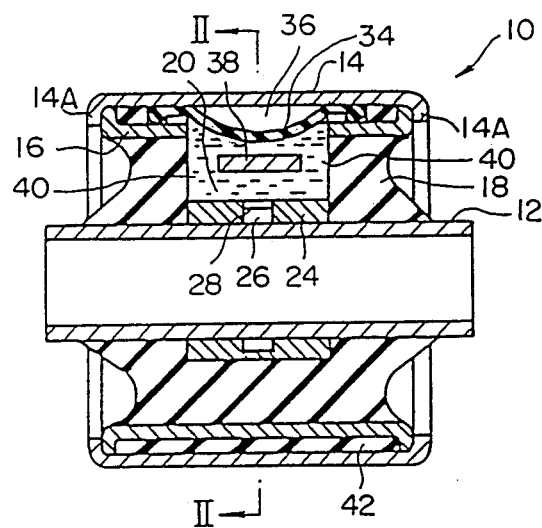
FIG. 1 shows a first embodiment of the vibration isolating apparatus according to the present invention, which corresponds to a sectional view taken along the line I—I in FIG. 2.
Figure 2:
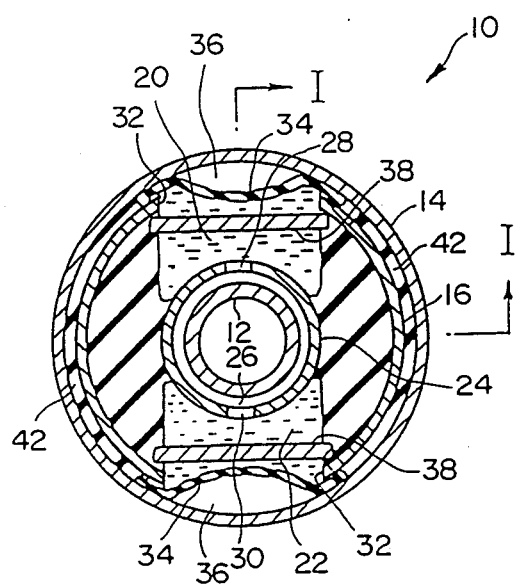
FIG. 2 is a sectional view taken along the line II—II in FIG. 1.

FIGS. 1 and 2 show in combination a first embodiment of the vibration isolating apparatus according to the present invention. The vibration isolating apparatus 10 has an inner tube 12 and an outer tube 14 which are disposed coaxially with each other. The inner tube 12 is connected to a vibration generating portion (not shown) such as a wheel of an automobile, and the outer tube 14 is connected to a vibration receiving portion (not shown) such as the body of the vehicle.

An intermediate tube 16 is coaxially disposed inside the outer tube 14. Two axial end portions of the tube 16 are bent outward, and two axial end portions of the outer tube 14 are bent inward to define bent portions 14A so that the bent portions 14A are pressed against the bent end portions of the intermediate tube 16, respectively, and the tube 16 is thereby rigidly secured to the outer tube 14.

A tubular rubber member 18 is bonded to the inner peripheral portion of the intermediate tube 16 and the outer peripheral portion of the inner tube 12 by means of vulcanization. Thus, the outer tube 14 is secured to the rubber member 18 through the intermediate tube 16.

The rubber member 18 is provided with a pair of hollow portions which extend from the outer periphery of a substantially axially central portion of the inner tube 12 in opposite directions symmetrically with each other with respect to the axial center of the inner tube 12 and which are filled with a fluid such as water or oil in such a manner that the fluid is tightly sealed therein, thus defining two liquid chambers 20 and 22. A ring 24 is rigidly secured to the outer periphery of a portion of the inner tube 12 which faces the liquid chambers 20 and 22. The ring 24 is provided in the inner peripheral portion thereof with a groove 26 which surrounds the outer periphery of the inner tube 12 and which is communicated with the liquid chambers 20 and 22 through small bores 28 and 30, respectively. Thus, the groove 26 serves as a limiting passage which provides communication between the liquid chambers 20 and 22.

As shown in FIG. 2, the intermediate tube 16 is cut at portions which respectively face the liquid chambers 20 and 22 so as to provide cut portions 32, thereby extending the liquid chambers 20 and 22 to the outside of the intermediate tube 16. Further, flexible membranes 34 are provided so as to face the liquid chambers 20 and 22, respectively, in such a manner that the peripheral portion of each membrane 34 is clamped between the intermediate tube 16 and the outer tube 14. One surface of each membrane 34 faces the liquid chamber 20 (or 22), and the other surface thereof cooperates with the outer tube 14 to define an air chamber 36 therebetween. The volumetric capacity of the air chamber 36 is preferably made substantially equal to the amount of liquid moving between the liquid chambers 20 and 22 when a high-frequency vibration of relatively small ampliture occurs.

Partitions 38 are provided on the inner peripheral side of the intermediate tube 16 so that they partition the liquid chambers 20 and 22, respectively. Thus, each of the liquid chambers 20 and 22 is partitioned into two small liquid chambers. Two longitudinal end portions of each partition 38 are supported by opposing walls of the liquid chamber 20 (or 22) as shown in FIG. 2, but two lateral end portions thereof define flow passages 40 between the same and the other opposing walls of the liquid chamber 20 (or 22) as shown in FIG. 1. The cross-sectional area of each flow passage 40 is made larger than that of the groove 26 and set so that liquid-column resonance readily occurs when high-frequency vibrations act on the apparatus.

A seal rubber member 42 is enclosed in the area between the inner tube 12 and the intermediate tube 16.

The following is a description of the operation of this embodiment.

The inner tube 12 is rigidly secured to a vibration source such as an automotive wheel (not shown), and the outer tube 14 to the body of the vehicle or the like.

Vibrations mainly act on the inner tube 12 in a direction perpendicular to the axis thereof. When a low-frequency vibration of relatively large amplitude acts on the inner tube 12, the vibration is absorbed by means of the fluid resistance which occurs when the liquid moves between the liquid chambers 20 and 22 through the groove 26.

When a high-frequency vibration of relatively small amplitude occurs, the groove 26 may be clogged or loaded. In such case, in response to the rise and fall in internal pressure in the liquid chambers 20 and 22, the air chambers 36 are expanded and contracted. In consequence, the liquid within each of the liquid chambers 20 and 22 moves through the flow passages 40, causing liquid-column resonance to occur at the flow passages 40, and resulting in a lowering of the dynamic scale factor, advantageously.

Figure 3:
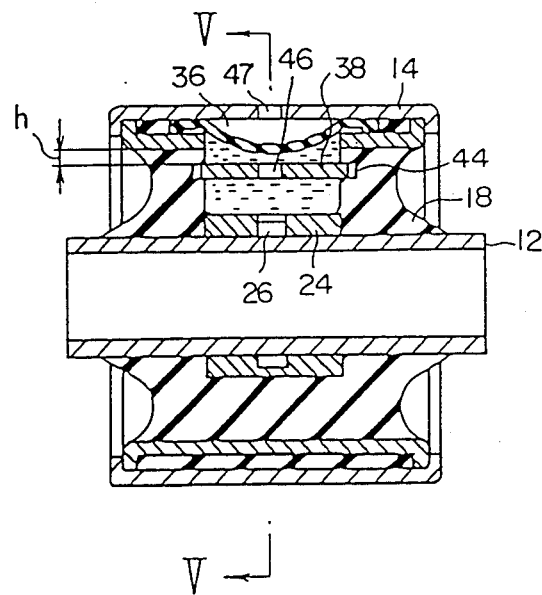
FIG. 3 is a sectional view of a second embodiment of the present invention, which corresponds to FIG. 1.
Figure 4:
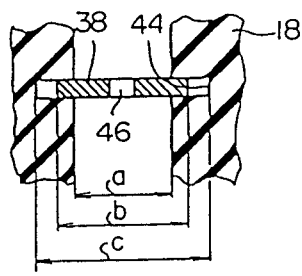
FIG. 4 is a fragmentary enlarged view of a part of the vibration isolating apparatus shown in FIG. 3.
Figure 5:
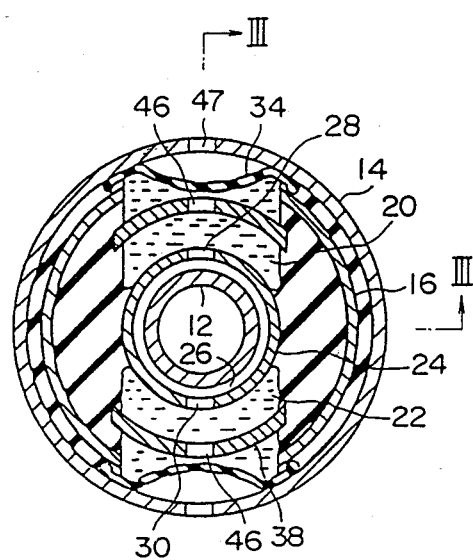
FIG. 5 is a sectional view taken along the line V—V in FIG. 3.

Referring next to FIGS. 3 to 5, there is shown a second embodiment of the present invention.

In this embodiment, the entire peripheral edge of each partition 38 is received in an annular recess 44 which is formed in the rubber member 18, and a small bore 46 is provided in the center of each partition 38 to define a flow passage.

The overall length b of the partition 38 is greater than the distance a between the opposing walls of each of the liquid chambers 20 and 22 but smaller than the distance c between the opposing bottom portions of the annular recess 44. It is preferable to set the relationship between a, b and c as follows:

$$(c-b) < (c-a)/2$$

Thus, the partition 38 can readily be fitted into the recess 44, and the rubber member 18 is allowed to move smoothly when vibrations of relatively large amplitude act thereon.

The distance h between the outer surface of the partition 38 and the inner surface of the intermediate tube 16 is preferably minimized in order to facilitate fitting of the partition 38 into the recess 44. By setting the length h as described above, the durability of the portion of contact between the partition 38 and the recess 44 is improved, because a portion of the rubber member 18 which is closer to the air chamber 36 is less deformed.

Further, positioning the partition 38 closer to the air chamber 36 causes an increase in the amount of vibratory deformation (surface area) of a portion of the rubber member 18 which defines a small liquid chamber on the side of the partition 38 which is remote from the air chamber 36, so that the amount of liquid which is moved by vibrations increases to allow liquid-column resonance to occur even more easily at the small bore 46, thus enabling a great lowering of the dynamic scale factor at the time of occurrence of high-frequency vibrations of relatively small amplitude.

It should be noted that in this embodiment each air chamber 36 is communicated with the outside air through an opening 47 provided in the outer tube 14, thereby facilitating the assembly. More specifically, any fluid which undesirably enters the air chamber 36 through opening 47 during assembly can readily be removed through the opening 47. Further, when the outer tube 14 is press-fitted into a hollow portion of a vehicle body or the like, the openings 47 serve to prevent any excessive rise in pressure in the air chamber 36 and thereby to allow liquid-column resonance to readily occurr in the liquid chambers 20 and 22.

Figure 6:
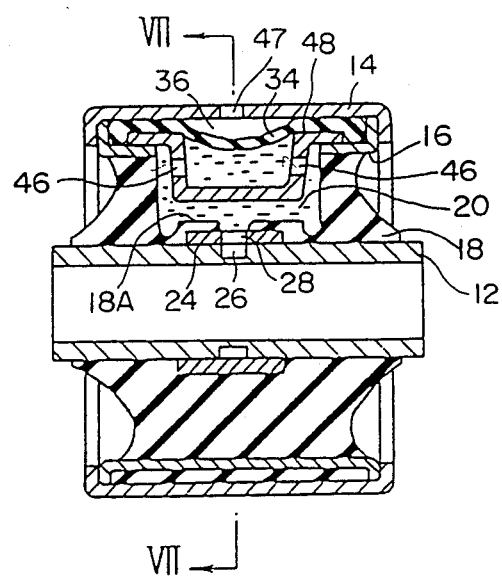
FIG. 6 is a sectional view of a third embodiment of the present invention, which corresponds to FIG. 1.
Figure 7:
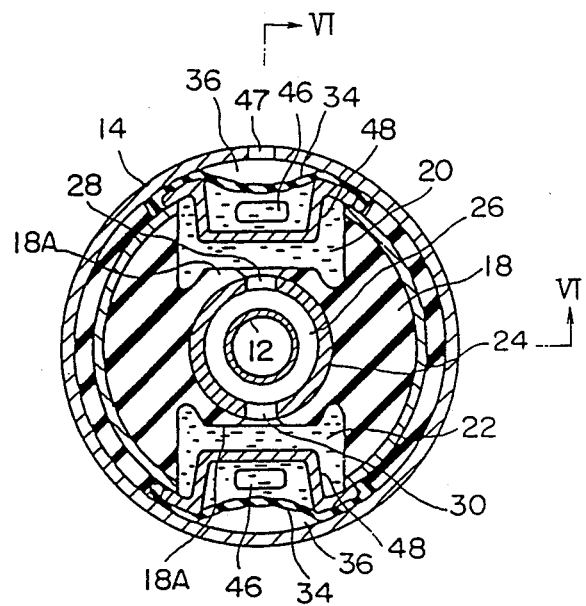
FIG. 7 is a sectional view taken along the line VII—VII in FIG. 6.

FIGS. 6 and 7 show in combination a third embodiment of the present invention.

In this embodiment, each partition 48 is clamped at its peripheral portion between the intermediate tube 16 and the flexible membrane 34. The partition 48 has its intermediate portion projecting into the liquid chamber 20 (or 22) to a substantial extent, and small bores 46 are provided in the side walls, respectively, of this projecting portion.

Unlike the above-described embodiments, this embodiment has no fear of the rubber member 18 being damaged, since the partitions 48 in this embodiment are moved relative to the rubber member 18 in response to the elastic deformation of the latter. Further, since the rubber member 18 has no grooves for receiving the partitions 48, there is no concentration of stress which would otherwise occur around each groove.

In addition, since vibratory deformation of the rubber member 18 occurs on the side of each partition 48 which is remote from the air chamber 36, the amount of liquid moved by vibrations increases to allow liquid-column resonance to readily occur at the small bores 46, which is advantageous in lowering the dynamic scale factor.

Since the intermediate portion of each partition 48 projects into the corresponding liquid chamber 20 (or 22) and is able to come into contact with the ring 24, it can also serve as a stopper. For this purpose, a thin-walled portion 18A which is integral with the rubber member 18 and extended therefrom is provided on the outer periphery of the ring 24 for cushioning the impact of the intermediate portion of the partition 48.

Thus, the static characteristics of the vibration isolating apparatus can be made linear, and therefore employment of the apparatus for a suspension of an automobile enables a great improvement in steering stability. In addition, the arrangement in accordance with this embodiment improves the durability of the rubber member 18.

Figure 8:
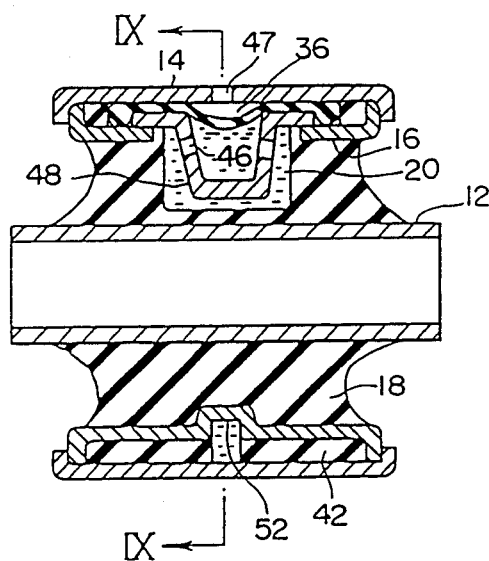
FIG. 8 is a sectional view of a fourth embodiment of the present invention, which corresponds to FIG. 1.
Figure 9:
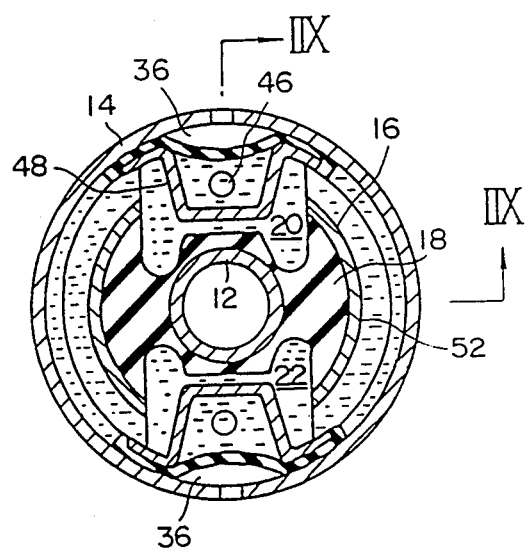
FIG. 9 is a sectional view taken along the line IX—IX in FIG. 8.

Referring next to FIGS. 8 and 9, there is provided a fourth embodiment of the present invention. In this embodiment, two opposing axially central portions of the intermediate tube 16 are drawn toward the inner tube 12 to define grooves 52, two axial ends of each groove 52 being communicated with the liquid chambers 20 and 22, respectively. Accordingly, this embodiment needs no ring such as the ring 24 which is fitted on the outer periphery of the inner tube 12 in the first embodiment, and each groove 52 serves as a limiting passage which provides communciation between the liquid chambers 20 and 22.

It should be noted that the area between the intermediate tube 16 and the outer tube 14 except for the groove 52 is hermetically sealed with the seal rubber member 42.

Figure 10:
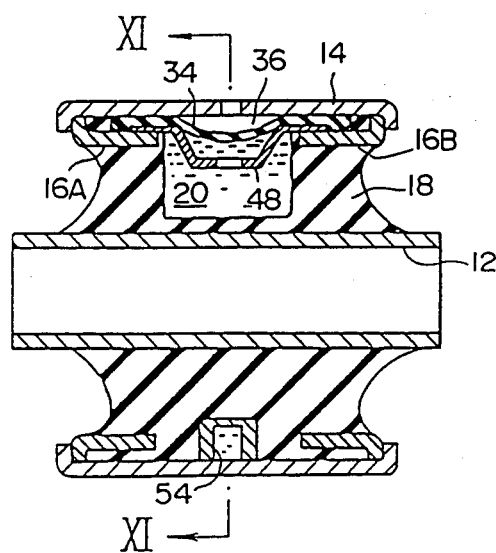
FIG. 10 is a sectional view of a fifth embodiment of the present invention, which corresponds to FIG. 1.

FIGS. 10 and 11 show in combination a fifth embodiment of the present invention. In this embodiment, the intermediate tube 16 in accordance with the first embodiment is cut at the axially central portion into intermediate tube members 16A and 16B, which are individually bonded to the outer periphery of the rubber member 18 by means of vulcanization. Groove members 54 are disposed between the intermediate tube members 16A and 16B, each member 54 having a U-shaped cross-section as shown in FIG. 10 and a C-shaped configuration in side view as shown in FIG. 11. The open side of each U-shaped groove member 54 is closed by the inner peripheral surface of the outer tube 14, while the outer peripheries of the other side portions of the groove member 54 are bonded to the rubber member 18 by means of vulcanization, and two axial ends of the groove member 54 are communicated with the liquid chambers 20 and 22, respectively.

Accordingly, each of the groove members 54 serves as a limiting passage for providing communication between the liquid chambers 20 and 22. Thus, this embodiment enables the apparatus to be readily produced at low costs as compared with the above-described embodiments, and permits the cross-sectional area of the limiting passage to be ensured at a appropriate value.

In the present invention, the outer tube 14 and the inner tube 12 may be secured to a vibration generating portion and a vibration receiving portion, respectively, in a reverse manner to that in the above-described embodiments.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A vibration isolating apparatus comprising:
   an inner tube which is able to be connected to either one of a vibration generating portion and a vibration receiving portion;
   an outer tube disposed on the outer peripheral portion of said inner tube so that said inner and outer tubes are coaxial or axially parallel with each other, said outer tube being able to be connected to the other of said vibration generating portion and said vibration receiving portion;
   a vibration absorbing resilient member interposed between said inner and outer tubes;
   a pair of liquid chambers provided in said resilient member so as to oppose each other across said inner tube;
   a limiting passage for providing communication between said pair of liquid chambers;
   a flexible membrane for partitioning each of said liquid chambers and an air chamber from each other, said air chamber being provided adjacent to said liquid chamber; and
   a partition for partitioning each of said liquid chambers into a plurality of small liquid chambers, said partition having a flow passage for providing communication between said small liquid chambers.

2. A vibration isolating apparatus according to claim 1, wherein said air chamber is disposed so as to face the inner periphery of said outer tube.

3. A vibration isolating apparatus according to claim 2, wherein two end portions of said partition are respectively received in recesses provided in opposing walls of the corresponding liquid chamber.

4. A vibration isolating apparatus according to claim 3, wherein a gap is provided between each end face of said partition and the bottom surface of the corresponding recess.

5. A vibration isolating apparatus according to claim 4, wherein said flexible membrane is supported at both end portions thereof between said outer tube and an intermediate tube which is secured to the inner side of said outer tube.

6. A vibration isolating apparatus according to claim 3, wherein the entire peripheral edge of said partition is received in a recess.

7. A vibration isolating apparatus according to claim 4, wherein said gap is set so as to satisfy the following formula:

$$(c-b)<(c-a)/2$$

where a is the distance between said opposing walls, b is the overall length of said partition, and c is the distance between the bottoms of said recesses.

8. A vibration isolating apparatus according to claim 3, wherein said outer tube is provided with an opening for allowing said air chamber to communicate with the outside air.

9. A vibration isolating apparatus according to claim 1, wherein said partition has its intermediate portion projecting toward said inner tube.

10. A vibration isolating apparatus according to claim 9, wherein said flow passage is defined by a bore provided in a side wall of said projecting portion of said partition.

11. A vibration isolating apparatus according to claim 10, further comprising an intermediate tube interposed between said outer tube and said vibration absorbing resilient member, said partition being clamped at the peripheral edge portion thereof between said intermediate tube and said flexible membrane 12. A vibration isolating apparatus according to claim 11, wherein the axially central portion of said intermediate tube is drawn toward said inner tube to define a groove, two axial end portions of said groove being respectively communicated with said pair of liquid chambers, so that said groove defines a limiting passage.

13. A vibration isolating apparatus according to claim 11, wherein said axially central portion of said intermediate tube is cut in the circumferential direction thereof, and a groove member having a U-shaped cross-section is disposed in the cut portion of said intermediate tube so as to extend in the circumferential direction of said inner tube, said groove member providing communication between said pair of liquid chambers to define a limiting passage.

14. A vibration isolating apparatus comprising:
an inner tube which is able to be connected to either one of a vibration generating portion and a vibration receiving portion;
an outer tube disposed on the outer peripheral portion of said inner tube so that said inner and outer tubes are coaxial or axially parallel with each other, said outer tube being able to be connected to the other of said vibration generating portion and said vibration receiving portion;
a tubular rubber member interposed between said inner and outer tubes;
a pair of liquid chambers provided in said rubber member so as to oppose each other across said inner tube;
a limiting passage for providing communication between said pair of liquid chambers;
a flexible membrane disposed between said outer tube and said rubber member to constitute one wall of each of said liquid chambers and define an air chamber between the same and said outer tube; and
a partition disposed in each of said liquid chambers for partitioning it into a plurality of small liquid chambers, said partition defining a flow passage for providing communication between said small liquid chambers, said flow passage having a larger cross-sectional area than that of said limiting passage.

15. A vibration isolating apparatus according to claim 14, wherein said partition is disposed in each of said liquid chambers in such a manner that two end portions of said partition are respectively received in recesses provided in opposing walls of said liquid chamber.

16. A vibration isolating apparatus according to claim 15, wherein each end face of said partition faces the bottom of the corresponding recess across a gap.

17. A vibration isolating apparatus according to claim 14, further comprising an intermediate tube disposed between said rubber member and said flexible membrane.

18. A vibration isolating apparatus according to claim 17, wherein said limiting passage is defined by a groove which is provided in the inner periphery of a ring rigidly secured to the outer periphery of said inner tube which faces said liquid chambers so that said groove extends along the outer periphery of said inner tube.

19. A vibration isolating apparatus according to claim 14, wherein said outer tube is provided with a bore for providing communication between said air chamber and the outside air.

20. A vibration isolating apparatus according to claim 19, wherein said partition has its intermediate portion projecting toward said inner tube, said flow passage being defined by a bore provided in a side wall of said projecting portion of said partition.

* * * * *